(12) United States Patent
Gaertner et al.

(10) Patent No.: US 9,366,249 B2
(45) Date of Patent: Jun. 14, 2016

(54) PISTON PUMP FOR DELIVERING FLUIDS AND ASSOCIATED VEHICLE BRAKE SYSTEM

(75) Inventors: Oliver Gaertner, Abstatt (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 497 days.

(21) Appl. No.: 13/819,858

(22) PCT Filed: Jul. 6, 2011

(86) PCT No.: PCT/EP2011/061387
§ 371 (c)(1),
(2), (4) Date: May 13, 2013

(87) PCT Pub. No.: WO2012/028361
PCT Pub. Date: Mar. 8, 2012

(65) Prior Publication Data
US 2014/0147316 A1    May 29, 2014

(30) Foreign Application Priority Data
Sep. 2, 2010 (DE) .......................... 10 2010 040 170

(51) Int. Cl.
| | |
|---|---|
| F04B 49/22 | (2006.01) |
| B60T 8/40 | (2006.01) |
| F04B 1/04 | (2006.01) |
| F04B 53/10 | (2006.01) |
| F16K 15/08 | (2006.01) |
| F16K 15/12 | (2006.01) |

(52) U.S. Cl.
CPC ............. *F04B 49/225* (2013.01); *B60T 8/4031* (2013.01); *F04B 1/0456* (2013.01); *F04B 53/1032* (2013.01); *F16K 15/08* (2013.01); *F16K 15/12* (2013.01)

(58) Field of Classification Search
CPC .... F04B 49/225; F04B 53/1032; F04B 53/10; F04B 53/103; F04B 39/1033; F04B 39/1086; F16K 15/12; F16K 15/08; F15B 15/149

USPC .................................. 417/559, 470; 92/163
See application file for complete search history.

(56) References Cited

U.S. PATENT DOCUMENTS

| | | | | |
|---|---|---|---|---|
| 1,489,912 A | * | 4/1924 | Winkler | .......................... 417/298 |
| 6,171,083 B1 | * | 1/2001 | Schuller | .......................... 417/549 |

FOREIGN PATENT DOCUMENTS

| | | |
|---|---|---|
| DE | 198 29 124 A1 | 8/1999 |
| DE | 100 13 269 A1 | 9/2001 |

(Continued)

OTHER PUBLICATIONS

International Search Report corresponding to PCT Application No. PCT/EP2011/061387, mailed Sep. 28, 2011 (German and English language document) (5 pages).

*Primary Examiner* — Devon Kramer
*Assistant Examiner* — Kenneth J Hansen
(74) *Attorney, Agent, or Firm* — Maginot, Moore & Beck LLP

(57) ABSTRACT

The disclosure relates to a pistol pump for delivering fluids comprising a piston, a cylinder element, and a pressure chamber arranged between an inlet valve and an outlet valve. The pressure chamber is closed off by a cover. The outlet valve comprises a closing body, a preload device which acts on the closing body, and a supporting mechanism configured to support the preload device. The outlet valve is arranged on the outer circumference of the cylinder element and adjusts a fluid flow conducted through at least one outflow opening between the cover and the cylinder element. The closing body is configured as a movable annular disk guided on the cylinder element, the inner diameter of which annular disk is matched to the outer diameter of the cylinder element.

7 Claims, 2 Drawing Sheets

(56) References Cited

FOREIGN PATENT DOCUMENTS

| DE | 10 2006 027 555 A1 | | 12/2007 |
|----|--------------------|---|---------|
| DE | 10 2008 002 740 A1 | | 12/2009 |
| GB | 28983 | | 0/1910 |
| GB | 876306 | * | 8/1961 |

* cited by examiner

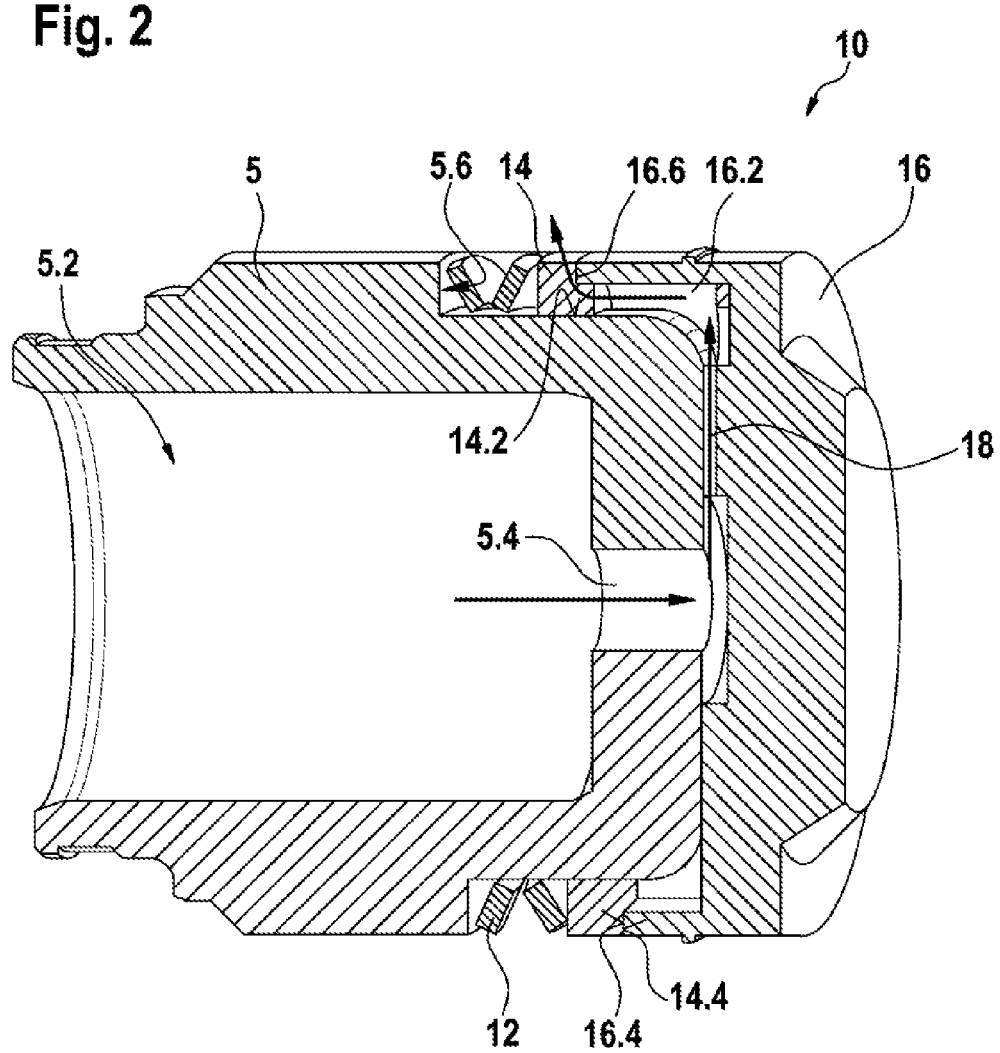

PISTON PUMP FOR DELIVERING FLUIDS AND ASSOCIATED VEHICLE BRAKE SYSTEM

This application is a 35 U.S.C. §371 National Stage Application of PCT/EP2011/061387, filed on Jul. 6, 2011, which claims the benefit of priority to Serial No. DE 10 2010 040 170.6, filed on Sep. 2, 2010 in Germany, the disclosures of which are incorporated herein by reference in their entirety.

BACKGROUND

The disclosure is based on a piston pump for delivering fluids as described herein. The present disclosure also concerns a vehicle brake system with such a piston pump.

Piston pumps are known in various embodiments from the prior art. For example in vehicle brake systems, often radial piston pumps with several pump elements are used for delivering pressure media, in which at least one piston can be moved to and fro by means of a cam. Typically these so-called pump elements comprise a piston, a piston running surface frequently formed as a cylinder, inlet and outlet valves and sealing elements. The valves serve to control the fluid on the pumping movement of the piston. The inlet valve serves to prevent the fluid from flowing back into the intake chamber during the compression phase, while the outlet valve prevents the fluid from flowing back from the pressure side into the pump interior. Typically these valves are formed as spring-loaded ball valves, wherein the outflow channel for the outlet valve is formed by a so-called outlet valve cover and the pump cylinder, and the outlet valve is accommodated in the outlet valve cover.

Publication DE 10 2008 002 740 A1 describes for example a piston pump for controlling brake pressure in a hydraulic vehicle brake system. The piston pump described comprises a pump housing, a receiver bore arranged in the pump housing for the piston pump, and a valve cover closing the receiver pump towards the outside, in which cover are arranged an outlet valve and first and second channel segments of an outflow channel.

Publication DE 10 2006 027 555 A1 describes for example a piston pump with reduced noise development. The piston pump described for delivering fluids comprises a piston, a cylinder element and a pressure chamber which is arranged between an inlet valve and an outlet valve and is closed by a cover, wherein the outlet valve comprises a closing body formed as a ball, a pretension device formed as a spiral spring acting on the closing body, a base element to support the pretension device and a disk element, and wherein a seal seat of the outlet valve is arranged on the disk element. Use of the disk element ensures that component tolerances of different components of the piston pump cannot have a negative effect on the outlet valve, and the installation space for the closing body formed as a ball and the pretension device formed as a spiral spring requires a large space.

SUMMARY

The piston pump according to the disclosure for delivering fluids has in comparison the advantage that the installation space for the outlet valve and hence for the piston pump can be minimized. Embodiments of the present disclosure can advantageously reduce the pressure pulsation level of the piston pump, wherein the closing body of the outlet valve responds quickly and precisely at low pressures and has a good closing behavior. Due to the reduced construction space of the piston pump, a larger installation space is available for a downstream pulsation damping element.

The core of the present disclosure is to arrange the outlet valve lying on the outside of the piston pump, and hence advantageously reduce the installation space necessary for the piston pump. Here the closing body is formed as an annular disk which is placed on the pump cylinder so that the closing body formed as an annular disk is guided by the pump cylinder. This advantageously leads to an excellent NVH behavior (noise, vibration, harshness). Furthermore this reduction in the spring mass system and the guidance of the closing body on the pump cylinder advantageously improve the functionality of the outlet valve. The closing body is pressed onto the cover by the pretension element resting on the pump cylinder, and seals axially and radially. The opening pressure of the outlet valve is adjusted via the pretension element, wherein the closing body is moved against the pretension element by the fluid pressure building up in the pressure chamber.

The piston pump according to the disclosure for delivering fluids comprises a piston, a cylinder element and a pressure chamber which is arranged between an inlet valve and an outlet valve and is closed by a cover, wherein the outlet valve has a closing body, a pretension device acting on the closing body and means for supporting the pretension device. According to the disclosure the outlet valve is arranged on the outer circumference of the cylinder element and adjusts a fluid flow conducted through at least one outflow opening between the cover and the cylinder element, wherein the closing body is formed as a movable annular disk guided on the cylinder element, the inner diameter of which is adapted to the outer diameter of the cylinder element.

The piston pump according to the disclosure can be used for example in a vehicle brake system for delivery of pressure media.

It is particularly advantageous that the pretension device is formed as a spring element and in the closed state presses the closing body against a seal seat arranged on the cover. Here the closing body, formed as an annular disk, in the closed state with a first sealing surface seals radially against the cylinder element and with a second sealing surface seals axially against the cover.

The pretension device of the piston pump is formed for example as a spiral spring and/or a flat spring and/or a cup spring and/or an undulating ring. Furthermore the spring properties of the pretension device predefine the opening pressure of the outlet valve. Thus the closing behavior of the outlet valve of the piston pump can advantageously be adapted simply and quickly to different pressures for use in different vehicle brake systems.

In an advantageous embodiment of the piston pump according to the disclosure, the means for supporting the pretension device formed as a spring element can be formed as an annular shoulder on the circumference of the cylinder element. The annular shoulder can advantageously easily be implemented by an inward step on the outer circumference of the cylinder element.

In a further advantageous embodiment of the piston pump according to the disclosure, the seal seat on the cover can be formed as a flat seal seat in order to allow a good axial seal between the closing body formed as an annular disk and the seal seat. To reduce noise further, at least one fluid channel is arranged in the cover such that it causes a 180° deflection of the fluid flow from the pressure chamber to the at least one outflow opening.

An embodiment example of the disclosure is shown in the drawings and explained in more detail in the description

BRIEF DESCRIPTION OF THE DRAWINGS

FIG. 2 shows a perspective cross section through a rear region of the piston pump for delivering fluids according to the disclosure shown in FIG. 1.

DETAILED DESCRIPTION

Figure 1:
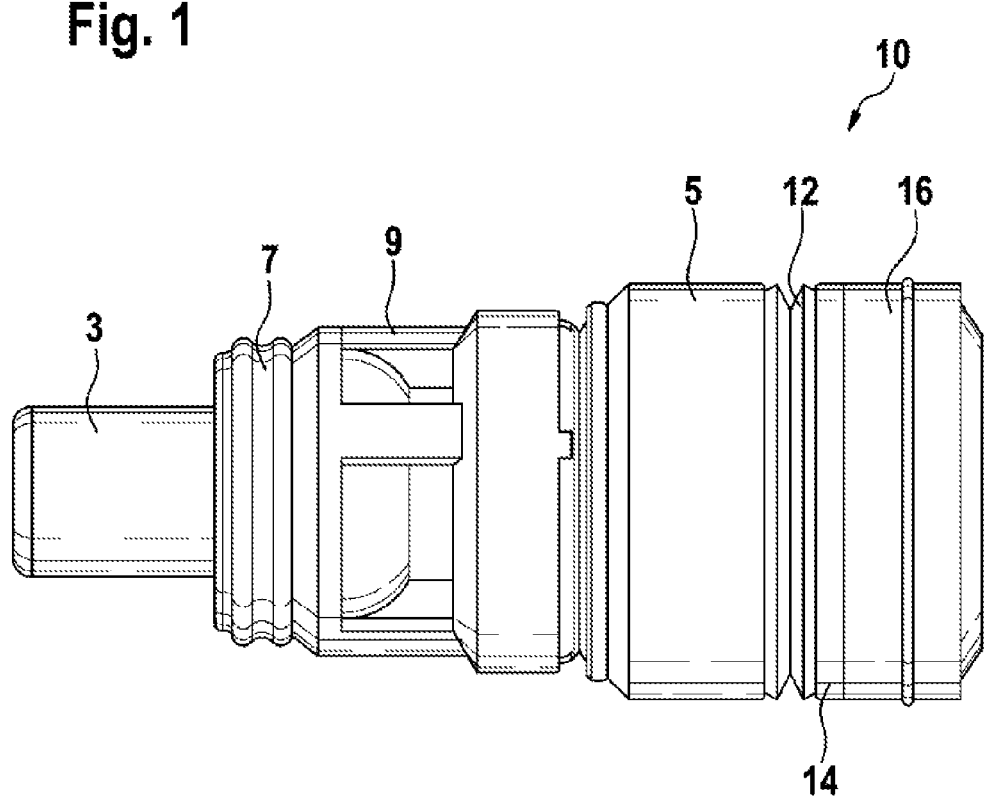
FIG. 1 shows a diagrammatic perspective view of an embodiment example of a piston pump according to the disclosure for delivering fluids.

As evident from FIGS. 1 and 2, a piston pump 1 according to the disclosure for delivering fluids comprises a piston 3, a cylinder element 5, a sealing element 7 and a fluid filter 9 arranged upstream of an inlet opening (not shown), behind which is arranged an inlet valve (not shown). Between the inlet valve (not shown) and an outlet valve 10, in the interior of the cylinder element 5 is arranged a pressure chamber 5.2 which is closed by a cover 16. The outlet valve 10 comprises a closing body 14, a pretension device 12 acting on the closing body 14 and means 5.6 for supporting the pretension device 12. The piston pump 1 shown can for example be arranged in a receiver bore (not shown) of a pump housing or a fluid block. Transverse pressure medium channels can open into the receiver bore, through which channels fluid is conducted over the fluid filter 9 to the inlet opening of the piston pump 1 or away from the at least one outlet opening of the piston pump 1.

According to the disclosure the outlet valve 10 is arranged on the outer circumference of the cylinder element 5 and adjusts a fluid flow 18 guided through at least one outflow opening 16.6 between the cover 16 and the cylinder element 5. Here the closing body 14 is formed as a movable annular disk which is guided on the cylinder element 5 and the inner diameter of which is adapted to the outer diameter of the cylinder element 5.

As also evident from FIGS. 1 and 2, the pretension device 12 is formed as a spring element and in the closed state presses the closing body 14 against a seal seat 16.4 arranged on the cover 16. In the embodiment example shown the pretension device 12 is formed as a cup spring. Alternatively the pretension device 12 can be formed as a spiral spring and/or a flat spring and/or an undulating ring.

As further evident from FIG. 2, the closing body 14, formed as an annular disk, in the closed state with a first sealing surface 14.2 seals radially against the cylinder element 5 and with a second sealing surface 14.4 seals axially against a seal seat 16.4 on the cover 16. The opening pressure of the outlet valve 10 is predefined by the spring properties of the pretension device 12. Furthermore the means 5.6 for supporting the pretension device 12 formed as a spring element are in the embodiment example shown formed as an annular shoulder on the circumference of the cylinder element 5.

As evident further from FIG. 2, the seal seat 16.4 on the cover 16 is formed as a flat seal seat. Also several fluid channels 16.2 are arranged in the cover 16, each of which causes a 180° deflection of the fluid flow 18 from an outlet opening 5.4 of the pressure chamber 5.2 to the at least one outflow opening 16.6.

Embodiments of the present disclosure according to the disclosure here advantageously allow optimum use of construction space and achieve excellent NVH behavior. Furthermore by reducing the spring mass system and by guiding the closing body on the pump cylinder, the functionality of the outlet valve is advantageously improved.

The invention claimed is:

1. A piston pump for delivering fluids comprising:
   a piston;
   an inlet valve;
   an outlet valve including (i) a closing body, (ii) a pretension device acting on the closing body, and (iii) a supporting surface configured to support the pretension device;
   a cylinder element defining a pressure chamber between the inlet valve and the outlet valve; and
   a cover configured to close the cylinder element,
   wherein the outlet valve is arranged on an outer circumference of the cylinder element and is configured to adjust a fluid flow conducted through at least one outflow opening defined between an inner surface of the cover and an outer surface of the cylinder element, and
   wherein the closing body includes a movable annular disk guided on the cylinder element, an inner diameter of the movable annular disk adapted to an outer diameter of the cylinder element,
   wherein:
   the pretension device includes a spring element, and
   in the closed state the pretension device presses the closing body against a seal seat arranged on the cover, and
   wherein the closing body is configured (i) to seal radially against the cylinder element with a first sealing surface in the closed state, and (ii) to seal axially against the cover with a second sealing surface in the closed state.

2. The piston pump as claimed in claim 1, wherein the spring element includes at least one of a spiral spring, a flat spring, a cup spring, and an undulating ring.

3. The piston pump as claimed in claim 1, wherein spring properties of the pretension device predefine an opening pressure of the outlet valve.

4. The piston pump as claimed in claim 1, further comprising an annular shoulder on the circumference of the cylinder element that defines the support surface.

5. The piston pump as claimed in claim 1, wherein the seal seat includes a flat seal seat.

6. The piston pump as claimed in claim 1, wherein:
   the cover defines at least one fluid channel configured to cause a 180° deflection of the fluid flow from the pressure chamber to the at least one outflow opening.

7. A vehicle brake system comprising:
   at least one piston pump including:
      a piston;
      an inlet valve;
      an outlet valve including (i) a closing body, (ii) a pretension device acting on the closing body, and (iii) a supporting surface configured to support the pretension device; and
      a cylinder element defining a pressure chamber between the inlet valve and the outlet valve; and
      a cover configured to close the cylinder element,
   wherein the outlet valve is arranged on an outer circumference of the cylinder element and is configured to adjust a fluid flow conducted through at least one outflow opening defined between an inner surface of the cover and an outer surface of the cylinder element, and
   wherein the closing body includes a movable annular disk guided on the cylinder element, an inner diameter of the movable annular disk adapted to an outer diameter of the cylinder element, wherein:
   the pretension device includes a spring element, and
   in the closed state the pretension device presses the closing body against a seal seat arranged on the cover, and wherein the closing body is configured (i) to seal radially against the cylinder element with a first sealing surface in the closed state, and (ii) to seal axially against the cover with a second sealing surface in the closed state.

\* \* \* \* \*